United States Patent [19]

Miller

[11] Patent Number: 5,868,206

[45] Date of Patent: Feb. 9, 1999

[54] AERATION TOOL AND MACHINE

[76] Inventor: Edward A. Miller, 1 Tropical Dr., Apt. 6, Ocean Ridge, Fla. 33435

[21] Appl. No.: 948,621

[22] Filed: Oct. 10, 1997

[51] Int. Cl.[6] .................................................... A01B 45/00
[52] U.S. Cl. ................................. 172/21; 172/93; 172/42
[58] Field of Search ................................. 172/21, 22, 43, 172/95, 91, 92, 93, 111, 42; 111/89, 118, 119, 120, 128

[56] References Cited

U.S. PATENT DOCUMENTS

| | | | |
|---|---|---|---|
| 2,261,722 | 11/1941 | Ervine | 172/21 |
| 2,299,378 | 10/1942 | Cain | 172/21 |
| 2,638,831 | 5/1953 | Ferguson et al. | 172/43 |
| 3,834,464 | 9/1974 | Carlson et al. | 172/22 |
| 4,178,860 | 12/1979 | Hines et al. | 172/21 X |
| 4,511,004 | 4/1985 | Deneen | 172/43 X |

*Primary Examiner*—Michael J. Carone
*Assistant Examiner*—Victor Batson
*Attorney, Agent, or Firm*—Malin, Haley, DiMaggio & Crosby, PA

[57] ABSTRACT

A turf aerating device and machine including a turf aerating device comprising a base platform having a plurality of star-shaped spikes removably mounted therein in perpendicular orientation with respect to the base platform surface so that the spikes vertically penetrate a desired turf surface. The spikes produce X-shaped holes and loosen the soil beneath the turf. A plurality of turf aerating devices are mounted to a corresponding number of vertically actuating rods and vertically actuated for penetrating the turf with the spikes without causing damage to the turf.

22 Claims, 5 Drawing Sheets

AERATION TOOL AND MACHINE

BACKGROUND OF THE INVENTION

1. Field of the Invention

This invention relates generally to a turf aerating device and machine, and more particularly to an aeration tool that is removably attachable to existing aerating machines and produces small, non-obstructive holes which achieve proper aeration without adversely affecting the playability of the turf on greens, fairways, and similar turf surfaces.

2. Description of the Background Art

Grass turf, especially on golf course greens and fairways, requires periodic aerification to loosen and impregnate the soil beneath with air and water. Several methods are known for aerating greens. For instance, one procedure, known as coring, removes dirt and green cores from the turf and deposits them on the turf. The problem with coring is that it leaves large plugs and holes all over the playing surface and has a tendency to remove vital organic materials therefrom. Another procedure punches holes in the green with solid spikes. Conventional spikes also produce unacceptably large holes and oftentimes compact the turf soil rather than loosening it. These aerification techniques also tend to pull up patches of turf when the punching spike or coring tool is pulled from the ground. Large holes, plugs, and torn turf on the green adversely affect playability and can often render the greens and fairways unplayable for several weeks. This is both frustrating for the golfer and costly for the country club. As a result, aerification is not always performed as often as necessary. Consequently, there exists a need for an aeration spiking tool and machine which can be used frequently for aerating turf surfaces without adversely affecting the look, feel, and playability of the golf course.

It has been determined that these problems can be solved with a less intrusive spiking device. While several different spikes are known in the art, none appear to address the foregoing. For example, U.S. Pat. No. 976,439 issued to Cunningham, comprises a rotary harrow that uses cylindrical spikes having sharpened blades. Cunningham fails to address the problems associated with aerating a golf course because it teaches an agricultural cultivating machine which pulverizes or breaks up the ground rather than aerating it. Thus, the Cunningham spikes are specifically designed for a rotary harrow machine. The spikes disclosed in Cunningham comprise a cylindrical shaft portion having blades thereabove that at no place extend past the peripheral limits of the cylindrical portion. The blades also have undesirable rounded edges and the shaft has a wider base section secured to a roller by clamping straps. Therefore, the spikes are not adaptable for use on other machines. In addition, the spikes and rotary harrow in Cunningham are designed to tear up the turf rather than preserve it. Thus, Cunningham does not offer a viable solution to the problems at hand.

Other devices known in the art also fail to address and solve the problems noted herein. For instance, U.S. Pat. No. 5,152,348 issued to Flanagan, Sr., et al. and U.S. Pat. No. 3,163,236 issued to Ray comprise turf spiking machines employing solid conical-shaped spikes. The spikes taught by Ray and Flanagan tend to compact the soil rather than loosen it and produce holes that are unacceptably large. Moreover, Flanagan, Sr., et al. incorporates complicated stripper angle plates and springs to compensate for the machine's tilted pistons. The tools disclosed in U.S. Pat. No. 2,299,378 issued to Cain and U.S. Pat. No. 2,261,722 issued to Ervin are also not relevant as they comprise hand tools having conical shaped spikes that make unacceptably large holes and damage the turf when pulling them therefrom.

Accordingly, there remains a need for an aerating tool and machine that effectively aerates turf without tearing up the turf or rendering it unusable. The instant invention addresses these problems by providing an aeration tool having a plurality of blocks and corresponding star-shaped spikes that are removably attachable to machines having linearly actuating rods.

SUMMARY OF THE INVENTION

The instant invention provides an aeration tool and machine that is primarily adapted for use on golf course greens and fairways. The invention produces substantially X-shaped openings in the turf without causing damage thereto or affecting the playability of the greens or fairways. The X-shaped openings produced by the invention are minimal in size compared to holes produced by the prior art so as to not affect the play or roll of a ball on the turf. More importantly, the instant invention effectively loosens the soil beneath the turf for receiving air and water without visibly affecting its playability. In fact, after a single cut, the holes produced are not even visible.

Since the playability of the turf is not affected, aeration can be done more frequently and the invention can be used as a supplemental or interim treatment device for periodically aerating in between major aeration treatments. For instance, the invention can be used every six weeks and may reduce the number of major aeration treatments needed. The instant aeration tool loosens the soil for air and water as required, relieves compaction, and breaks up algae. The instant invention produces superior results without the inconveniences noted in the background art.

The aeration tool of the instant invention comprises a base platform or block having a plurality of openings for removably securing a corresponding number of star-shaped spikes and a collar for removably attaching the tool to an aerating machine. The platform is shaped to accommodate the spikes without wasting material, so that manufacturing is cost effective. The spikes employed comprise a lower cylindrical shaft and a plurality of fin-like flanges extending longitudinally therefrom and outward from a central axis. The spikes converge from two different sections at different angles to eventually form a pointed piercing end. The cylindrical shaft portion of the spikes snugly mate with the platform openings and thus define a fixed end. Meanwhile, the pointed end defines a free end which is used for piercing the turf. When the spikes penetrate the turf and are removed, inconspicuous X-shaped holes are made in the turf. The spikes of the instant invention loosen the soil rather than compact it, and reduce the likelihood of pulling up turf. In addition, the aeration goes unnoticed by the player, so that the course is still usable. It should be noted that spikes may vary in size in accordance with the objects of the invention.

The collar of the platform is used for attaching the aeration tool to the aeration machine actuating rods. The actuating rods preferably reciprocate in a vertical, linear motion to reduce the likelihood of turf damage. The turf machine is motor operated and may comprise any aeration machine known in the art having actuator rods as described herein. The machine is also retrofitted with a stabilizing connecting bar and a plurality of turf stabilizing arms extending substantially perpendicularly outward therefrom. The stabilizing arms press against the turf as the spikes are driven therein and removed therefrom to prevent the turf from pulling up. Thus, the stabilizing arms reinforce the turf and insure proper operation of the instant invention.

It is an object of the instant invention to provide an aeration tool that can effectively aerate a turf, green, or fairway without affecting the roll of a ball or without rendering the turf unplayable.

It is another object of the instant invention to provide an aeration tool comprising a plurality of spikes that produce X-shaped holes that are smaller and less conspicuous than the holes produced by conventional aeration devices.

It is an additional object of the instant invention to provide an aeration tool that is adaptable for use on existing machines having vertically reciprocating actuating rods as opposed to a rotary type of machine.

It is a further object of the instant invention to provide an aeration tool that is cost effective and convenient for manufacture.

It is still another object of the instant invention to provide a turf aerating tool that is rustproof.

It is still another object of the instant invention to provide a turf aerating tool comprising a plurality of platforms with a plurality of spikes, wherein the platform is easily securable to an existing machine having actuator rods.

It is still an additional object of the instant invention to provide a turf aerating tool comprising a plurality of star-shaped tines that may vary in size.

It is still a further object of the instant invention to provide a turf aerating tool that can be used to provide interim aeration treatment to golf turf, greens, and fairways without rendering the golf course unplayable.

It is yet another object of the instant invention to provide a turf aeration tool and machine that decreases the number of major aeration treatments necessary by allowing for more frequent and less obtrusive aeration.

It is yet an additional object of the instant invention to provide a turf aerating tool that does not leave large plugs, large holes, or organic materials on the turf being treated, such as greens and fairways.

In accordance with these and other objects which will become apparent hereinafter, the instant invention will now be described with particular reference to the accompanying drawings.

BRIEF DESCRIPTION OF THE DRAWINGS

FIG. 4a is an elevational view of the preferred spike of the instant invention, illustrating one side of the spike and the concave structure of the spike securing cavity.

FIG. 4b is an elevational view of the preferred spike of the instant invention, illustrating a side opposite the spike securing cavity.

FIG. 4c is another elevational view of the preferred spike of the instant invention, illustrating the spike securing cavity head on.

DESCRIPTION OF THE PREFERRED EMBODIMENTS

With reference to the drawings, FIGS. 1–6 depict the preferred embodiment of the instant invention, generally referenced by the numeric character 10. In accordance with the preferred embodiment of the invention, the turf aerating tool generally comprises a base platform 12 and a plurality of star-shaped spikes 30 mounted in each platform 12. The instant invention further comprises a system having a plurality of spike loaded platforms 12 and a turf aerating machine 50 having a plurality of linearly actuated rods/pistons, each supporting a base platform 12 and a turf stabilizing device 56, 58 retrofitted to the machine 50 in proximity to the platform for reinforcing the turf during operation.

Figure 1:
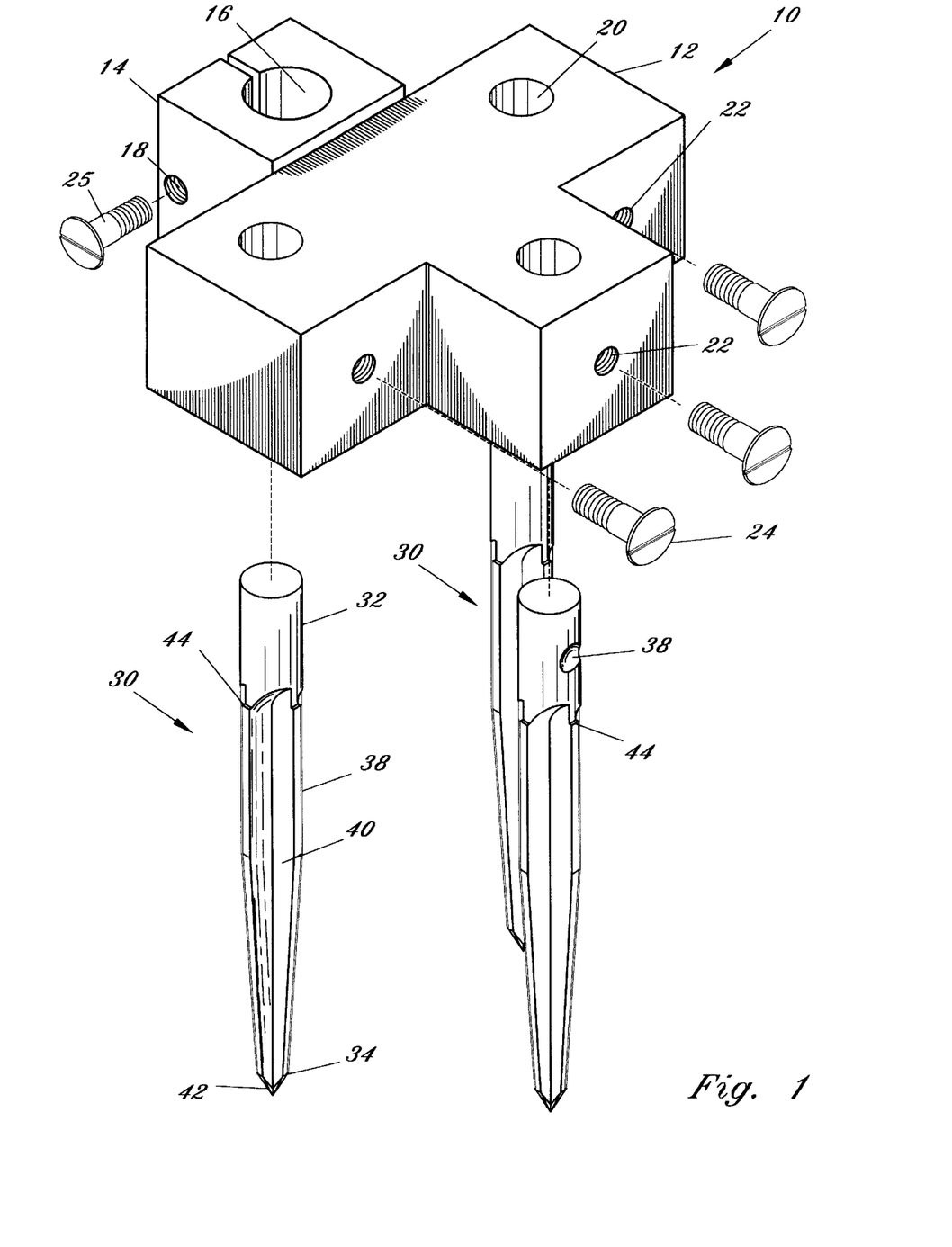
FIG. 1 is an exploded perspective view of the preferred embodiment of the aeration tool of the instant invention.
Figure 2:
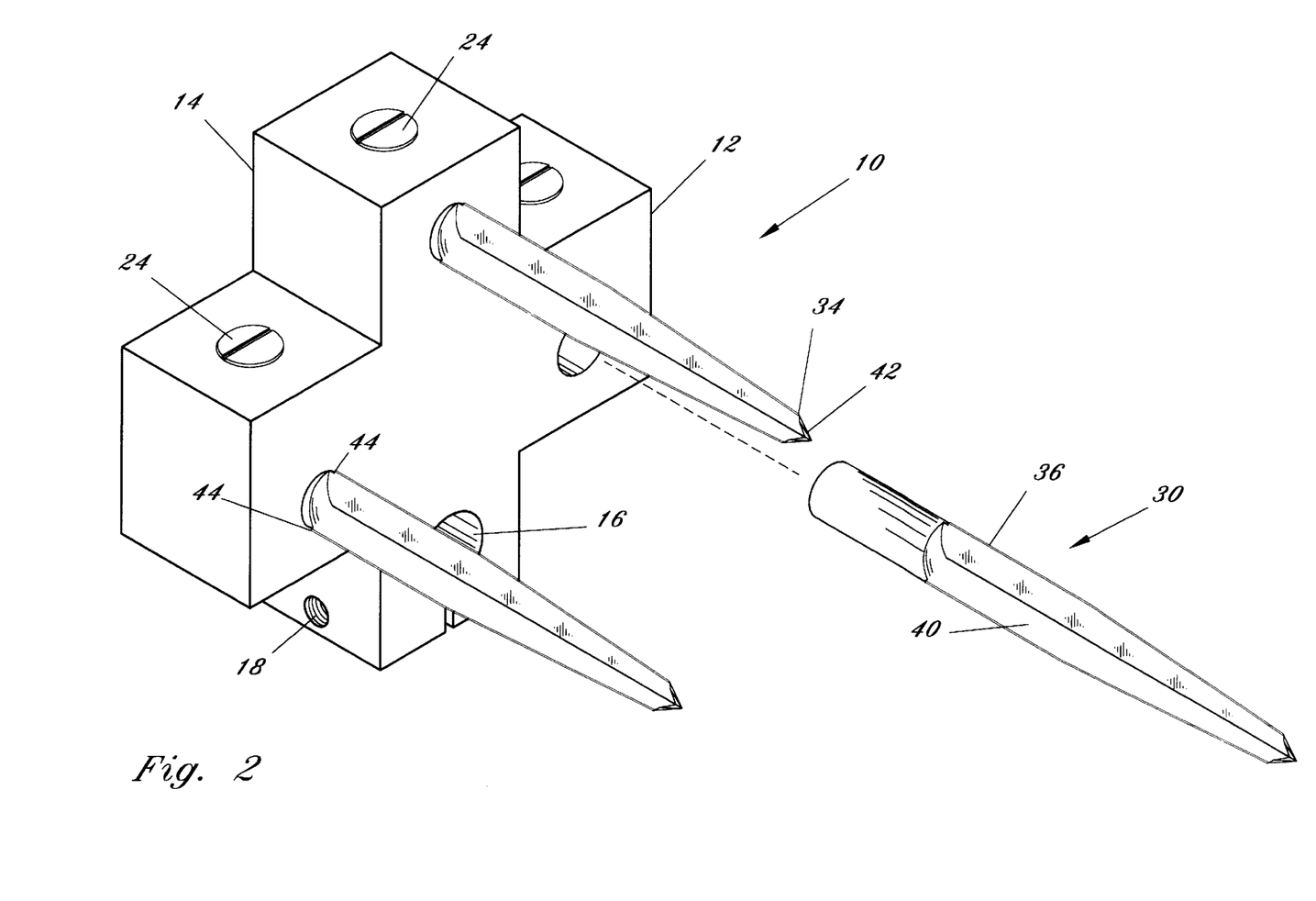
FIG. 2 is a bottom perspective view of the aeration tool in accordance with the preferred embodiment, illustrating one spike exploded therefrom.

Referring to FIGS. 1 and 2, each platform has a mounting collar 14, a plurality of spike mounting ports 20, and a plurality of threaded spike securing ports 22, each being in communication with a corresponding spike mounting port 20. A plurality of spikes 30, preferably three, are securely mounted to each platform 12 via the spike securing ports 22. The spikes 30 are star-shaped, whereby they have a plurality of radially projecting fin-like flanges 36. As the machine 50 is traversed across the ground, it linearly actuates the platforms 12 and spikes 30 such that the spikes 30 penetrate and impale the turf to loosen the underlying soil. By virtue of the star-shaped structure of the spikes 30, the spikes 30 leave a minimally obstructive X-shaped aeration hole in the turf and allow air and water to replenish the loosened soil. The holes made in the turf go virtually unnoticed by players, especially after a first cut, so the movement of golf balls goes unaffected. This is in contrast to prior art aeration devices and methods which leave large holes in the greens and fairways rendering the course unplayable for extended periods of time. It should be noted that although the instant invention is discussed herein in reference to golf courses, the invention may also be used on other turf surfaces, including, but not limited to, baseball fields, grass tennis courts, and other grass surfaces requiring nondestructive aeration.

Figure 3:
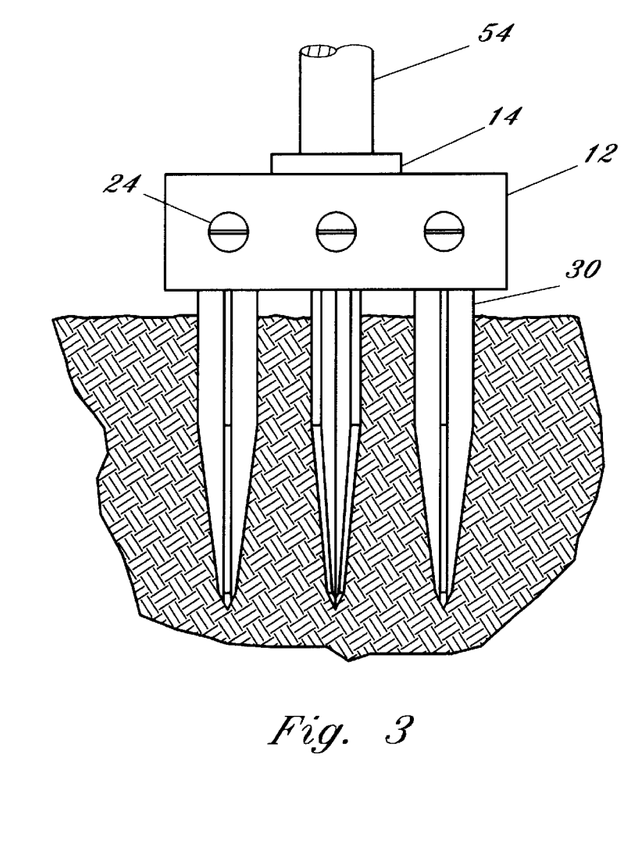
FIG. 3 is a front elevational view of the aeration tool of the instant invention shown penetrating turf.
Figures 4A, 4B, 4C:
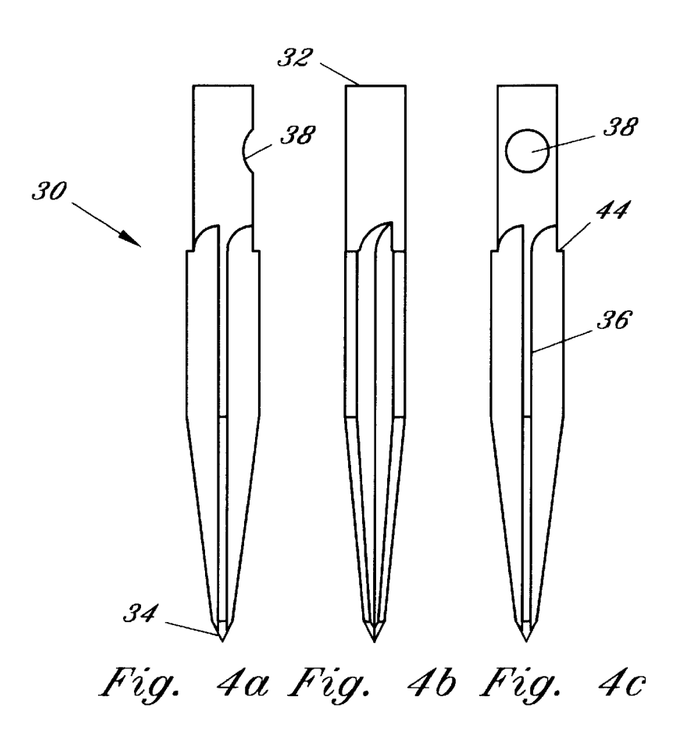
Figure 4D:
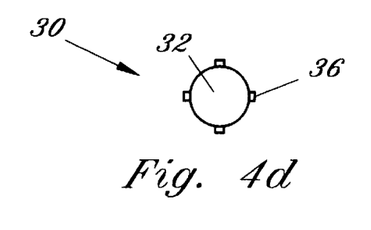
FIG. 4d is a bottom elevational view of the preferred spike of the instant invention, illustrating the lowest end of the spike shaft and the flange ledges.
Figure 4E:
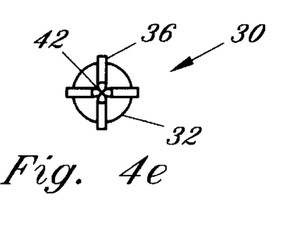
FIG. 4e is a top elevational view of the preferred spike of the instant invention, illustrating the piercing pointed end and the extension of the fin-like flanges outside the circumferential edges of the shaft.

With reference to FIGS. 3–4e, the preferred spikes 30 of the instant invention comprise a cylindrical shaft 32, fin-like flanges 36, two converging sections which converge at different angles, and a pointed piercing end 34. The cylindrical shaft 32 provides a fixed end and has a diameter corresponding to the spike mounting ports so that the shaft 32 snugly mates with the ports 22. This is important for preventing undesirable movement of the spikes 30 during operation, which could result in tearing up the turf. Once the spikes 30 are mounted, the cylindrical shaft 32 provides a fixed end. The cylindrical shaft 32 preferably defines a circular and concave cavity 38. The cavity 38 is preferably circular for receiving a securing bolt or similar hardware as it is threaded through a corresponding spike securing port 22, as defined by the platform 12. Thus, when the shaft 32 is inserted into the spike mounting port 20, the cavity 38 must be oriented in alignment with the spike securing port 22 to allow the corresponding fastener to engage the cavity 38.

Each spike 30 includes a plurality of fin-like flanges 36, preferably four, projecting radially outward from a central longitudinal axis. The fin-like flanges 36 extend radially outward past the outer cylindrical limits of the shaft 32. As a result, the flanges 36 at their upper end each form a ledge/stop 44 that rests on the platform 12 when the spike shafts are inserted in the respective platform port 20. This serves to limit the penetration of the spikes 30 into the platform 12 and facilitates alignment of each shaft cavity 38 with its corresponding spike securing port 22.

The spikes 30 converge at two different points towards a defined piercing point 34. At a midsection 40, the fin-like flanges 36 first converge at a first predetermined angle, as shown in FIGS. 4A–4C. Proximal the piercing point 34, the fin-like flanges 36 converge at a second and more steep predetermined angle so as to define the piercing point 34. This design has been determined to provide superior results over rounded or arcuate spikes known in the background art.

As it is a main objective of the instant invention to reduce the damage to the turf and the size of the holes made therein, the spikes 30 are designed to loosen the soil rather than remove it. To effectuate this goal, the fin-like flanges 36 curve at their lower end and blend into the shaft to reduce the amount of material pulled from the turf. This curved portion is proximal the ledge 44 and is apparent in FIGS. 4A–4C.

The spikes 30 are preferably manufactured from a #1018 cold rolled steel. The spikes are preferably black oxidized and coated to prevent rusting. In addition, it is case hardened and nickel plated. The base platform 12 is also preferably constructed from the same or similar material. The most important objective here is to prevent the instant invention 10 from rusting and extending longevity of use. Consequently, similar material substitutes, such as stainless steel and plastic, may be employed without departing from the scope and spirit of the instant invention.

With reference to FIGS. 1–3, the preferred embodiment of the base platform 12 is shown. The base platform 12 preferably comprises a T-shaped body having a plurality of spike mounting ports 20, preferably three, a mounting collar 14, and a plurality of threaded spike securing ports 22. The body structure of the base platform 12 is preferably T-shaped for a platform having three spike mounting ports 20 to conserve material during manufacture and prevent waste. Accordingly, the platform 12 may vary from the shown geometric shape without departing from the scope and spirit of the instant invention. Each spike mounting port 20 is sized to snugly receive the spike shaft 32 so as to insure a tight fit. Relative to the spike mounting ports 20, the platform 12 also defines a corresponding number of spike securing ports 22 in communication with the spike mounting ports 20. The spike securing ports 22 are preferably threaded for receiving a bolt or similar fastener 24. When a spike 30 mounted in port 20, a fastener, such as a bolt or screw 24, is threaded through spike securing port 22 until it tightly and firmly engages the spike 30. As noted above, each spike 30 has a shaft portion 32 with a cavity 38 defined therein. Thus, the spike 30 is oriented so that the cavity 38 aligns with spike securing port 22 so that the fastener used engages the corresponding cavity 38. This has been determined to provide an enhanced securing measure and can is limit the likelihood of dislodgement.

The platform 12 also comprises a mounting collar 14 secured to or formed integrally with the body portion described above.

Figure 5:
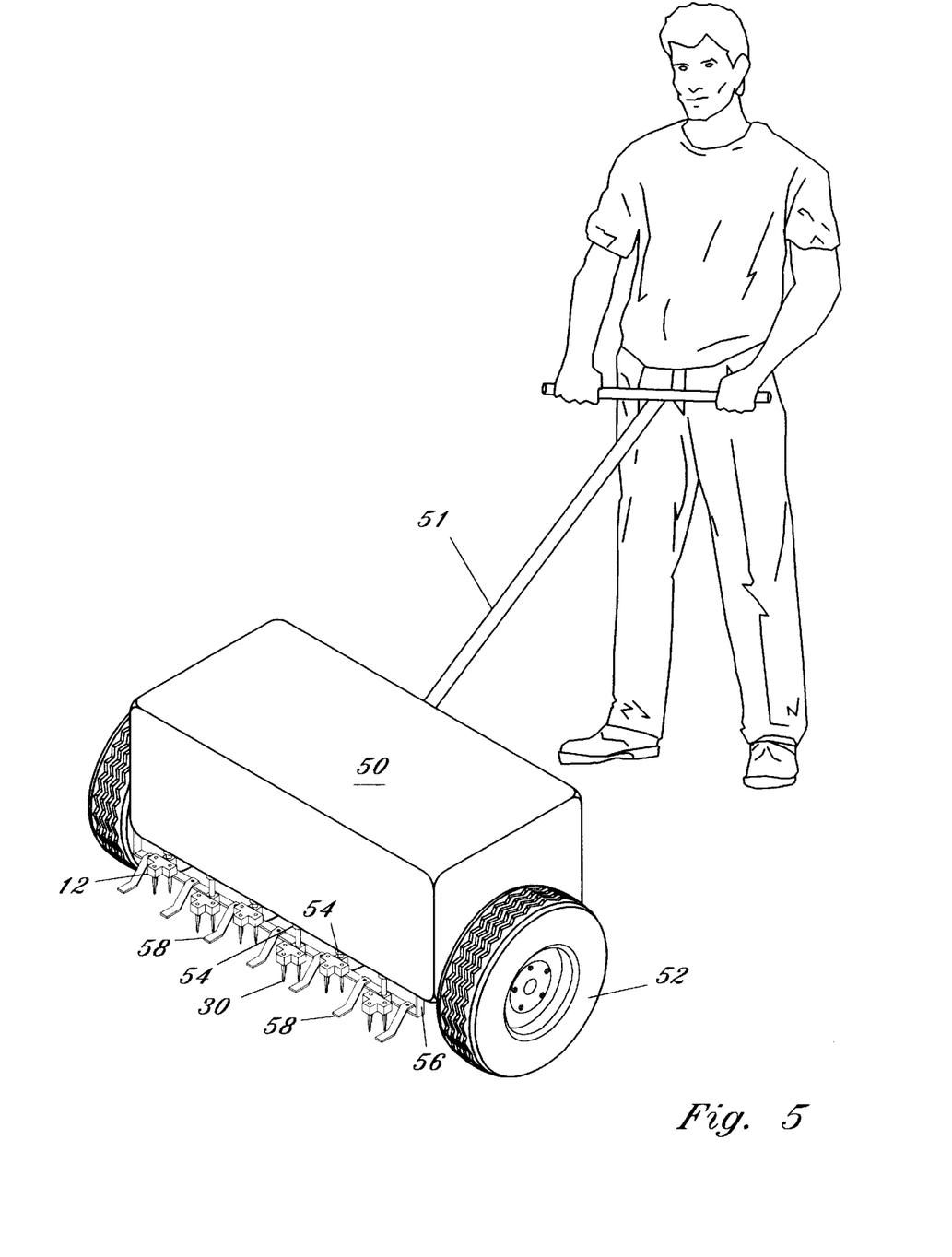
FIG. 5 is a perspective view of the preferred embodiment of the machine of the instant invention, illustrating the invention in use.
Figure 6:
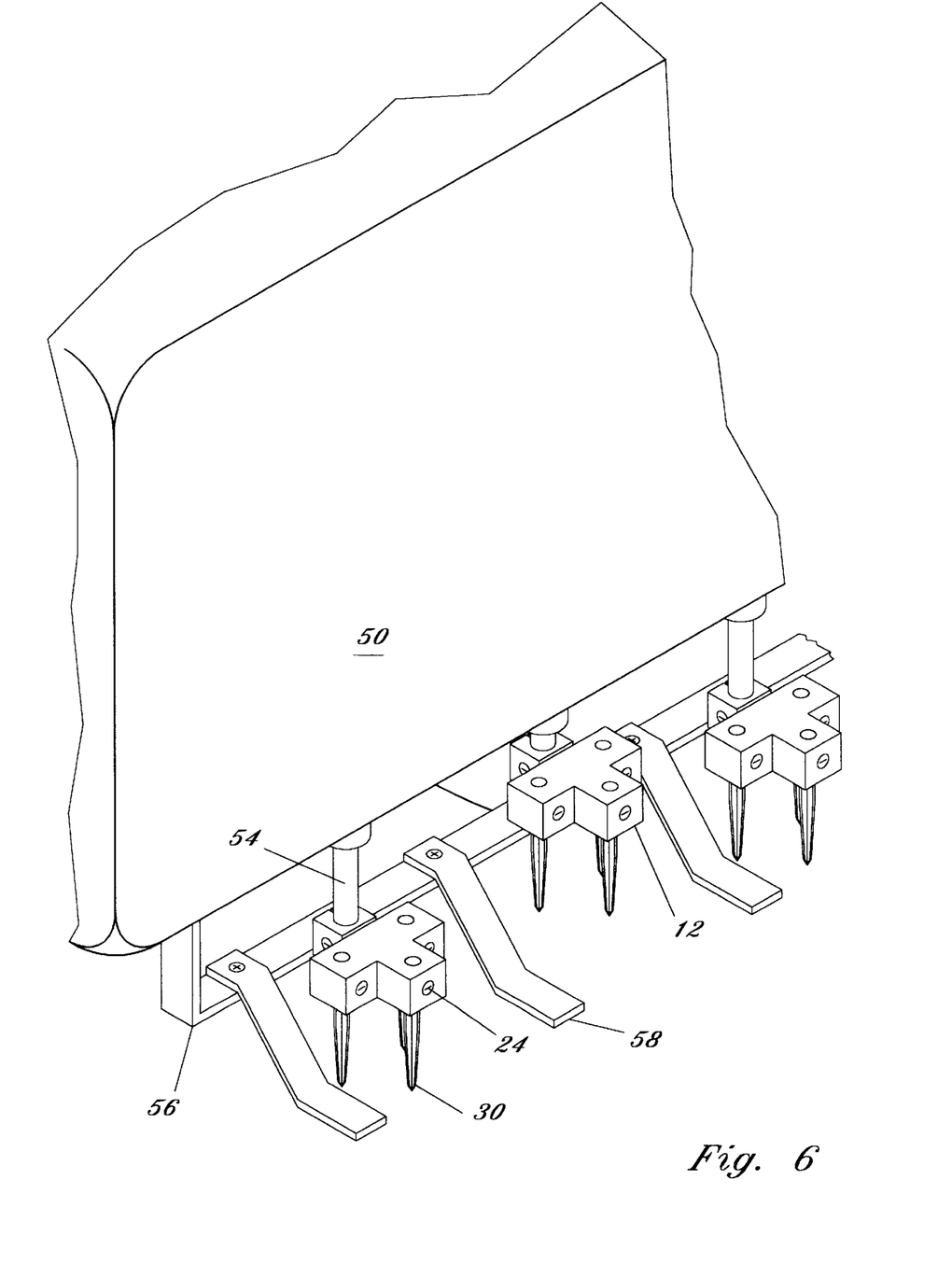
FIG. 6 is an enlarged partial view of the machine and aeration tool of the instant invention in accordance with the preferred embodiment, and further illustrating the turf reinforcing structure.

The mounting collar 14 defines a collar passage 16, as shown in FIGS. 1 and 2. The collar passage 16 is designed to snugly mate with an actuating rod 54 on the machine 50, as shown in FIGS. 5 and 6. The collar passage 16 is preferably opened to facilitate convenient mounting and secure clamping onto the actuating rod 54.

A threaded collar port 18 is defined in each collar for receiving a bolt or similar hardware to firmly clamp the mounting collar 14 to the actuating rod 54. Referring to the drawings, the collar 14 appears to extend above one surface of the base platform 12. The spikes 30 are preferably secured to the platform 12 on the opposite or flush surface. The collar 14 rises above the top surface of the platform 12 to facilitate proper clearance and attachment to the machine 50. it should be noted, however, that the shape and orientation of the mounting collar 14 with respect to the platform body may vary to accommodate the cognizant machine 50 without departing from the scope and spirit of the invention.

Referring to FIGS. 5 and 6, the instant invention may also include a machine 50 having a plurality of vertically reciprocating actuator rods 54, tires 52, handle 51 and motor. The instant invention incorporates additional structure for reinforcing the turf. The actuating rods 54 of the preferred machine 50 reciprocate substantially vertically as opposed to a rotary device so that the spikes 30 are impaled and pulled directly into and out of the turf. When mounted to the actuating rods 54, the base platform 12 should be substantially parallel with the turf surface. Each base platform 12 is mounted to a corresponding actuating rod 54 by inserting each corresponding actuating rod 54 through the mounting collar passages 16. Thereafter, a fastener 25 is threaded through the threaded collar port 18 until the platform can no longer rotate about the actuator rod 54. When the machine 50 is operating, the actuator rods reciprocate vertically so that the spikes impale the turf. In one embodiment, the entire actuating rod assembly 54, motor and machine may be elevated above the turf with cylinders known in the art so that the spikes 30 do not penetrate the turf when such is not desired. Likewise, the machine and actuator rod assemblies may be lowered for continuing the aeration procedure. The instant invention may employ a turf aerating machine 50 known in the art, such as those manufactured and sold under the trade name "Greensaire." The turf aerating machine 50 is preferably motor driven and has vertically and linearly actuating rods or pistons which are driven either hydraulically via a cylinder or electrically. Moreover, the novel aerating tool 10 is designed to mount to the actuating arms 54. It should be noted, however, that other machines may be employed so long as the turf aerating device 10 is caused to directly penetrate the earth.

The instant invention also addresses the concerns associated with pulling up turf by retrofitting the machine with a turf stabilizing assembly. The turf stabilizing assembly preferably comprises a stabilizing arm connecting bar 56 and a plurality of turf stabilizing arms 58. The turf stabilizing arms 58 are preferably connected at both ends of the connecting bar 56 and in between each set of base platforms 12. The turf stabilizing arms 58 are bent at two points at opposing angles such that a first end of the stabilizing arm connects to the connecting bar 56, and the opposite end engages the turf. The engaging section of the stabilizing arm 58 should preferably be somewhat horizontal with the turf so that it reinforces the turf rather than piercing it. The machine 50 may also include a handle 51 so that it may be conveniently traversed across the turf. In operation, as the machine is pulled or pushed. The actuating rods 54 are reciprocated so that the turf aerating device 10 moves therewith, forcing the spikes 30 into and out of the turf.

Once a surface has been completely aerated, the ground should be virtually unaffected and ready for use. In accordance with the objects of the invention, after mowing the turf, all holes formed therein should be inconspicuous. Regardless of whether the turf is mowed, the turf remains playable. The instant invention may be used as a primary source of aerating. However, it is primarily intended to provide a supplemental means for aerating turf surfaces in between major aeration treatment. By using the instant invention, aeration can be done every six weeks without jeopardizing the use of the course. This should also serve to extend the time between which major aeration needs to be performed.

As a point of reference, the following dimensions may be used for the aeration tool 10 of the instant invention. The base platform may be approximately 3 inches across, 1 inch wide, and 1 inch thick. The distance between the two back spike mounting ports 20 may be 2 inches, with the center port 20 being centered 1 inch above the other two ports. The collar opening 16 may be approximately ¾ to 1 inch in diameter. The collar may 1–¼ inches wide along all edges and extend about ¼ inch above the top surface of the platform body. The spike 30 has a cylindrical shaft 32 which may be approximately 1 inch in height, while the blades may be approximately 3 inches in height. These dimensions may vary without departing from the scope and spirit of the instant invention.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An aeration tool for use in aerating turf when vertically and linearly pierced into the turf with an actuating device, said tool comprising:
    a plurality of star-shaped spikes for forming substantially X-shaped holes in the turf, each of said spikes comprising a cylindrical shaft portion and a plurality of flanges extending longitudinally downward from a lower end of said shaft portion and projecting radially outward from a central longitudinal axis, said flanges converging from a midsection to form a piercing point; and
    a platform comprising a plurality of spike receiving apertures corresponding to the number of said star-shaped spikes, wherein each of said spike receiving apertures is sized for snugly receiving said cylindrical shafts such that said spikes project outward from a selected surface of said platform, said platform further comprising means for securing said spikes in each of said spike receiving apertures and a mounting collar for mounting said platform to the actuating device such that said spikes penetrate the turf when said platform is vertically actuated.

2. A tool as recited in claim 1, wherein said flanges of each said spikes extend beyond said cylindrical shaft of each said spike such that said flanges engage said selected surface of said platform when said cylindrical shafts are inserted in said spike receiving apertures.

3. A tool as recited in claim 2, wherein said spike securing means comprises:
    a plurality of spike securing ports; and
    said plurality of spike receiving apertures corresponding in number to said spike securing ports and being in communication with said spike securing ports, each of said spike securing ports being adapted to receive a fastener for tightly engaging said cylindrical shafts.

4. A tool as recited in claim 3, wherein each of said spikes further comprise a cavity for receiving said fastener.

5. A tool as recited in claim 2, wherein said flanges further comprise:
    a first converging edge which converges from said midsection toward said piercing point at a predetermined angle; and
    a second converging edge which converges from said first converging edge into said piercing point at a second predetermined angle exceeding said first predetermined angle.

6. A tool as recited in claim 2, wherein said tool comprises:
    three of said star-shaped spikes and, corresponding thereto, three of said spike receiving apertures.

7. A tool as recited in claim 6, wherein said platform is substantially T-shaped for accommodating said three spike receiving apertures.

8. A tool as recited in claim 2, wherein said mounting collar includes a threaded port for receiving a corresponding fastener that tightly clamps said mounting collar to the actuating device.

9. A tool as recited in claim 1, further comprising:
    a turf reinforcement means for reinforcing the turf when said spikes pierce the turf and are pulled from the turf.

10. A tool as recited in claim 1, further comprising:
    means for impaling the turf with said spikes.

11. An aeration tool for use with an aeration machine having
    a plurality of vertically and linearly actuating rods, the tool and machine being used in aerating turf, said tool comprising:
    a plurality of star-shaped spikes for forming substantially X-shaped holes in the turf, each of said spikes comprising a cylindrical shaft portion and a plurality of flanges extending longitudinally downward from a lower end of said shaft portion and projecting radially outward from a central longitudinal axis, said flanges converging from a predetermined point to form a piercing point, said flanges extending over and outside said cyclindrical shaft so as to form a plurality of ledges; and
    a platform comprising a plurality of spike receiving apertures corresponding to the number of said star-shaped spikes, wherein each of said spike receiving apertures is sized for snugly receiving said cylindrical shafts such that said spikes project outward from a selected surface of said platform, said ledges engaging said selected surface to limit penetration of said spikes into said spike receiving apertures;
    said platform further comprising a plurality of spike securing ports individually in communication with a corresponding spike receiving aperture and adapted for threadably receiving a fastener, and a mounting collar for mounting said platform to the actuating rod such that said spikes penetrate the turf when said platform is vertically actuated.

12. A tool as recited in claim 11, further comprising:
    a turf reinforcement means for reinforcing the turf when said spikes pierce the turf and are pulled from the turf.

13. A tool as recited in claim 12, wherein said turf reinforcement means comprises:
    a plurality of reinforcement arms secured to the machine and oriented in proximity to the actuating rods and said platforms, said arms engaging the turf as said spikes engage and disengage the turf.

14. A tool as recited in claim 11, wherein said flanges further comprise:

a first converging edge which converges from said predetermined point toward said piercing point at a first predetermined angle; and a second converging edge which converges from said first converging edge into said piercing point at a second predetermined angle exceeding said first predetermined angle.

15. A tool as recited in claim 14, wherein said mounting collar includes a threaded port for receiving a corresponding fastener that tightly clamps said mounting collar to the corresponding actuating rod.

16. A tool as recited in claim 15, wherein each of said spikes further comprise a cavity for receiving said fastener.

17. An aeration tool for use in aerating turf, said tool comprising:

a machine having at least one actuating rod, said machine causing said actuating rod to linearly reciprocate;

a plurality of star-shaped spikes for forming substantially X-shaped holes in the turf, each of said spikes comprising a cylindrical shaft portion and a plurality of flanges extending longitudinally downward from a lower end of said shaft portion and projecting radially outward from a central longitudinal axis, said flanges converging from a midsection to form a piercing point, said flanges extending over and outside said cyclindrical shaft so as to form a plurality of ledges; and at least one platform comprsing a plurality of spike receiving apertures corresponding to the number of said star-shaped spikes, wherein each of said spike receiving apertures is sized for snugly receiving said cylindrical shafts such that said spikes project outward from a selected surface of said platform, said ledges engaging said selected surface to limit penetration of said spikes into said spike receiving apertures;

said platform further comprising means for securing said spikes in each of said spike receiving apertures and a mounting collar for mounting said platform to said actuating rod such that said spikes penetrate the turf when said platform and said actuating rod is vertically actuated by said machine.

18. A tool as recited in claim 17, wherein said spike securing means comprises:

a plurality of spike securing ports, each said spike securing port being individually in communication with a corresponding spike receiving aperture, said spike receiving aperture being adapted for receiving a fastener that tightly engages said cylindrical shafts.

19. A tool as recited in claim 18, wherein each of said spikes further comprise a cavity for receiving said fastener.

20. A tool as recited in claim 19, wherein said flanges further comprise:

a first converging edge which converges from said midsection toward said piercing point at a predetermined angle; and a second converging edge which converges from said first converging edge into said piercing point at a second predetermined angle exceeding said first predetermined angle.

21. A tool as recited in claim 20, further comprising:

a turf reinforcement means, connected to said machine, for reinforcing the turf when said spikes pierce the turf and are pulled from the turf.

22. A tool as recited in claim 21, wherein said turf reinforcement means comprises:

a plurality of reinforcement arms positioned in proximity to the actuating rods and said platforms, said arms engaging the turf as said spikes engage and disengage the turf.

\* \* \* \* \*